F. BERENSTEIN.
RUBBER TREAD FOR BOOTS AND SHOES.
APPLICATION FILED JAN. 29, 1917.
1,281,273.
Patented Oct. 15, 1918.
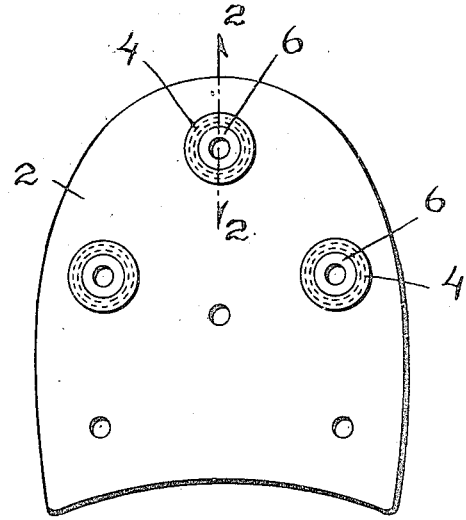
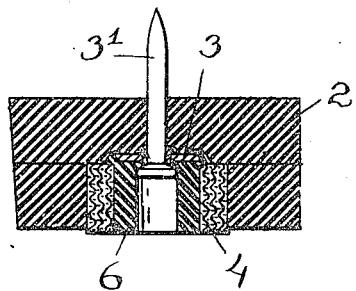
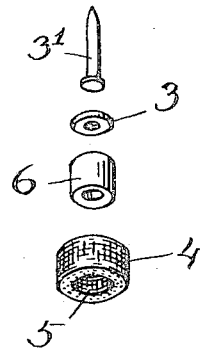
Witness
Stuart Hilder.
Inventor
Frank Berenstein.
E. W. Anderson
his Attorney

UNITED STATES PATENT OFFICE.

FRANK BERENSTEIN, OF CHELSEA, MASSACHUSETTS.

RUBBER TREAD FOR BOOTS AND SHOES.

1,281,273.                   Specification of Letters Patent.     Patented Oct. 15, 1918.

Application filed January 29, 1917.   Serial No. 145,190.

*To all whom it may concern:*

Be it known that I, FRANK BERENSTEIN, a citizen of the United States, residing at Chelsea, in the county of Suffolk and State of Massachusetts, have made a certain new and useful Invention in Rubber Treads for Boots and Shoes, of which the following is a specification.

Figure 1 is a bottom plan view of a heel having the invention applied thereto.

Fig. 2 is a section on the line 2—2, Fig. 1.

Fig. 3 shows detail perspective views of the plug, the post, the washer and the nail.

The invention has relation to rubber heels, and particularly to friction plugs for such heels and other tread members of boots and shoes, having for its object the provision of certain improvements upon the patent granted to Frank Berenstein, No. 1,173,088, dated February 22, 1916. It is found in practice that, in the device of the said patent, even when the post is made of hard rubber or similar material, the union or adherence of the rubber-coated canvas plug to the hard rubber post, and of said plug to the metal washer at the back, is not at all perfect, whereby the plug is not securely held in place in the heel. It is further found that a hard rubber plug or plug of similar material will to some extent scratch a polished floor. The object of this invention is to overcome these objections.

In the accompanying drawings, illustrating the invention, the numeral 2 designates a rubber heel, 3 a perforated back plate or washer, usually of circular form and of metal, and 4 the plug, engaged within a recess of the heel, wound from a strip of frictionized canvas or other suitable rubber-coated material and provided with a central perforation 5.

The fastening nail 3' has its head engaged within the perforation of the hollow post and its shank engaged with the center perforation of the metal back plate. The perforation of the back plate is of smaller size than that of the hollow post, and is provided with a marginal portion overlying the top of the perforation of the post and adapted to be engaged by and back up the head of said nail.

6 is the post, located within the perforation of the plug and formed of a material different from that of the metal back plate or washer, the object being to provide a post of a material to which the rubber-coated material of the plug will vulcanize or properly adhere, and of a material to which the metal washer will closely adhere or become cemented.

To this end, the post 6 is made of soft rubber of first quality, and preferably of a diameter larger than in the case of the metal plug and approaching the diameter of the washer at the back of the plug.

In the manufacture of the heel, the rubber material of the post will vulcanize perfectly with the rubber constituent of the plug, forming a perfect union between plug and post, and will also closely adhere to the lower face of the washer and even flow within the perforation of the washer, so that it will become practically impossible for the plug to fall out of the heel.

I claim:

1. In a rubber tread for boots and shoes, having a recess, a hollow plug of rubber-coated fabric material located within said recess, a hollow post of soft rubber fitting within the perforation of said plug, and a perforated metal washer overlying said plug and said post, said post being vulcanized to said plug and closely cemented to said washer.

2. In a rubber tread for boots and shoes, having a recess, a hollow plug of rubber-coated fabric material located within said recess, a hollow post of soft rubber fitting within the perforation of said plug, and a perforated metal washer overlying said plug and said post, said post being of a diameter approaching that of said washer and being closely cemented to said washer and vulcanized to said plug.

In testimony whereof I affix my signature in presence of two witnesses.

FRANK BERENSTEIN.

Witnesses:
WILLIAM A. CARRY,
MORRIS MORRISON.